United States Patent
Waugh

(10) Patent No.: US 10,409,551 B1
(45) Date of Patent: Sep. 10, 2019

(54) VOICE-DRIVEN MONITORING OF RESOURCES IN A SERVICE PROVIDER NETWORK

(71) Applicant: Amazon Technologies, Inc., Seattle, WA (US)

(72) Inventor: Robert Mark Waugh, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 208 days.

(21) Appl. No.: 15/188,139

(22) Filed: Jun. 21, 2016

(51) Int. Cl.
*G10L 15/30* (2013.01)
*G06F 3/16* (2006.01)
*H04L 29/08* (2006.01)
*G10L 17/22* (2013.01)
*G10L 15/26* (2006.01)

(52) U.S. Cl.
CPC .............. *G06F 3/167* (2013.01); *G10L 15/26* (2013.01); *G10L 17/22* (2013.01); *H04L 67/16* (2013.01); *H04L 67/36* (2013.01)

(58) Field of Classification Search
None
See application file for complete search history.

(56) References Cited

U.S. PATENT DOCUMENTS

| | | | | |
|---|---|---|---|---|
| 6,311,157 | B1* | 10/2001 | Strong | G10L 15/1822 704/243 |
| 2013/0158991 | A1* | 6/2013 | Dong | G08G 5/0013 704/235 |
| 2017/0358300 | A1* | 12/2017 | Laurens | G10L 15/1822 |

OTHER PUBLICATIONS

U.S. Appl. No. 13/733,604, filed Jan. 3, 2013, First Named Inventor: Mentz et al. "Managing Resources in a Distributed Execution Environment", 57 pages.
U.S. Appl. No. 14/660,551, filed Mar. 17, 2015, First Named Inventor: Kahrs et al. "Resource Tagging and Grouping", 67 pages.
Web article: "AWS Lambda" published by Amazon, 2016 [online][retrieved on: May 31, 2016] retrieved from: https://aws.amazon.com/lambda/, 10 pps.

(Continued)

*Primary Examiner* — Abul K Azad
(74) *Attorney, Agent, or Firm* — Lee & Hayes, P.C.

(57) ABSTRACT

Technologies are disclosed for voice-controlled monitoring of computing resources in a service provider network. Verbal requests for information about the status of computing resources in a service provider network are recorded and transmitted to a voice service. The spoken utterances are translated into text and analyzed to determine the intent of the speaker and to extract relevant words by a voice service. The voice service provides a request to a serverless compute service that identifies the intent of the speaker and includes the words extracted from the verbal utterance. The serverless compute service, in turn, executes a voice command processing function to identify the resources, obtain the status information, and construct a textual reply to the request that includes the status information. The textual reply can then be provided to the voice service for conversion into spoken audio and playback to the requesting user.

20 Claims, 7 Drawing Sheets

(56) References Cited

OTHER PUBLICATIONS

Web article: "Core Components: AWS Lambda Function and Event Sources" published by Amazon, 2016 [online][retrieved on: May 31, 2016] retrieved from: http://docs.aws.amazon.com/lambda/latest/dg/intro-core-components.html, 13 pps.

Web article: "Creating an AWS Lambda Function for a Custom Skill" published by Amazon, 2016 [online][retrieved on: May 31, 2016] retrieved from: https://developer.amazon.com/appsandservices/solutions/alexa/alexa-skills-kit/docs/developing-an-alexa-skill-as-a-lambda-function, 5 pps.

Web article: "JSON Interface Reference for Custom Skills" published by Amazon, 2016 [online][retrieved on: May 31, 2016] retrieved from: https://developer.amazon.com/public/solutions/alexa/alexa-skills-kit/docs/alexa-skills-kit-interface-reference, 9 pps.

* cited by examiner

US 10,409,551 B1

VOICE-DRIVEN MONITORING OF RESOURCES IN A SERVICE PROVIDER NETWORK

BACKGROUND

Some network-based computing service providers allow customers to purchase and utilize computing resources, such as virtual machine ("VM") instances, on a permanent or as-needed basis. In addition to VM instances, such computing service providers typically allow customers to purchase and utilize other types of computing resources. For example, customers might be permitted to purchase access to and use of file and block data storage resources, database resources, networking resources, and other types of computing resources. Utilizing these computing resources as building blocks, customers of such a network-based computing service can create custom solutions that provide various types of functionality, such as application hosting, backup and storage, content delivery, World Wide Web ("Web") hosting, enterprise information technology ("IT") solutions, database services, and others.

Managing network-based services such as those described above can be extremely complex. At least some of this complexity is attributable to the large number of computing resources that typically exist in such a service at any given time. For example, some network-based services might utilize dozens of data centers around the world, hundreds of thousands or even millions of server computers, along with large numbers of networking components, software programs, and other types of resources.

In order to obtain information regarding the operational status of a particular resource, system administrators typically utilize information-dense graphical user interfaces ("GUIs") to obtain needed information. However, access to such GUIs is not always available to administrators, such as when they are traveling or otherwise away from a computer capable of accessing the GUI. Consequently, it can be difficult and time consuming to obtain information regarding the operational status of computing resources utilized to implement a network-based application.

The disclosure made herein is presented with respect to these and other considerations.

DETAILED DESCRIPTION

Figure 1:
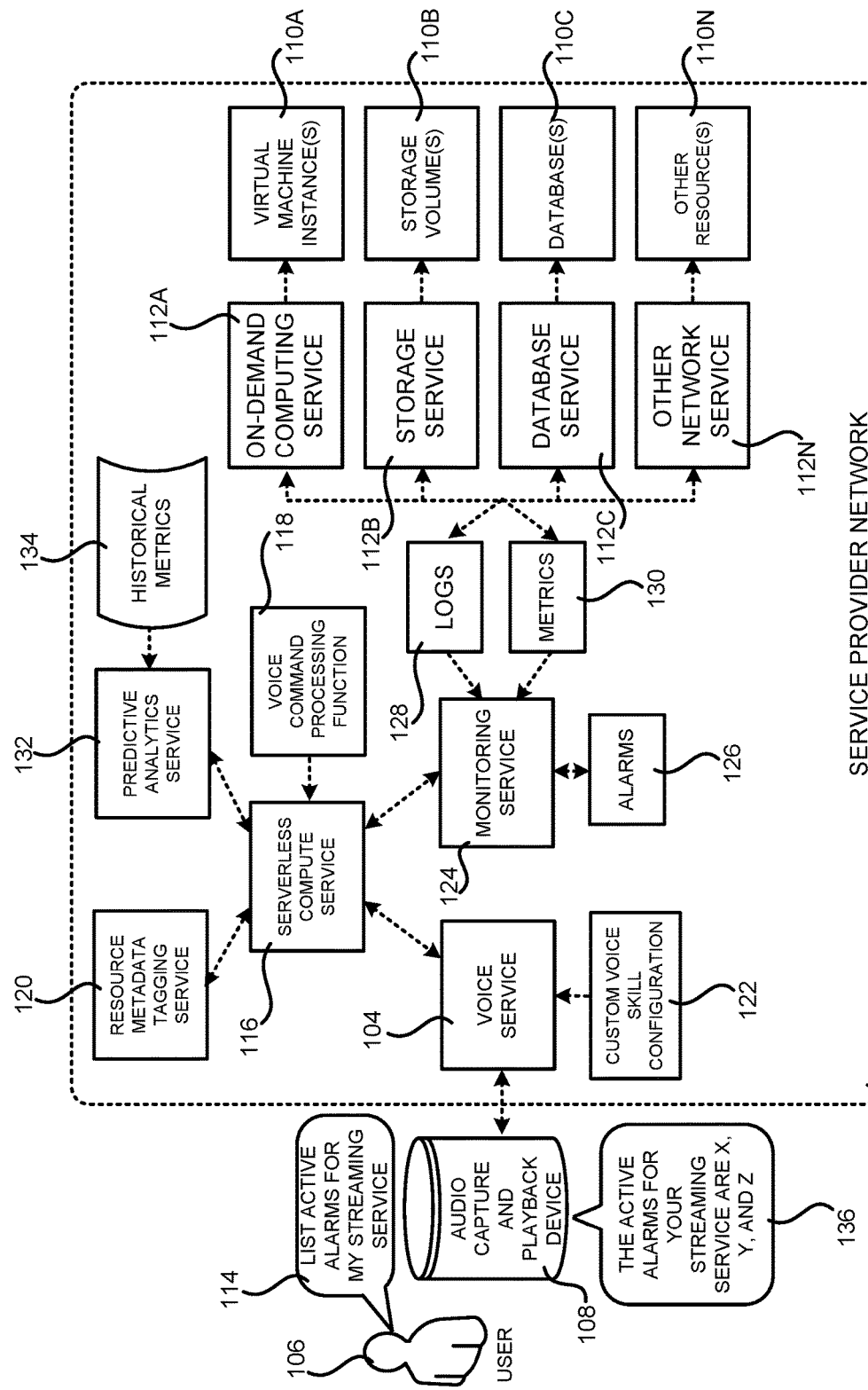
FIG. 1 is a software and network architecture diagram showing aspects of the configuration and utilization of a mechanism for voice-driven monitoring of resources in a service provider network, according to one particular configuration.

The following detailed description is directed to technologies for voice-driven monitoring of resources in a service provider network. Through an implementation of the disclosed technologies, a voice-based user interface can be provided for obtaining information regarding the operational status of computing resources in a service provider network. Using the voice-based interface, system administrators can access this information even when they are traveling or otherwise removed from a computer capable of accessing the information through a GUI. Technical benefits other than those specifically mentioned herein can also be realized through an implementation of the disclosed technologies.

In order to enable the functionality disclosed herein, a voice service, a monitoring service, a serverless compute service, a resource metadata tagging service, and a predictive analytics service are executed in a service provider network that is configured to provide computing resources on a permanent or an as-needed basis. Among other types of functionality, the computing resources provided by the service provider network can be utilized to implement the various network services and other programs described herein. The computing resources provided by the service provider network can include various types of computing resources, such as data processing resources like VM instances, data storage resources, networking resources, data communication resources, network services, and the like.

In one particular configuration, a user of the service provider network can utilize an audio capture and playback device to issue verbal requests for information about the status of computing resources in the service provider network. The audio capture and playback device can record these utterances and transmit them to a voice service, which also executes in the service provider network. The voice service translates the spoken utterances into text. The voice service also analyzes the text to determine the intent of the speaker and to identify key words in the spoken text. The voice service can then provide a request for information to the serverless compute service that identifies the intent of the speaker and includes the words extracted from the verbal utterance.

The serverless compute service, in turn, executes a voice command processing function for obtaining the requested status information and constructing a textual reply to the request. For example, and without limitation, the voice command processing function can identify the computing resources provided by the service provider network for which status information is to be provided. In some scenarios, the computing resources for which status information is to be provided can be identified directly from the words extracted from the utterance. In other scenarios, the resource metadata tagging service can be utilized to identify the computing resources for which the status information is to be provided.

Once the computing resources for which the status information is to be provided have been identified, the status information can be obtained. In one configuration, the status information is obtained from a monitoring service that is configured to monitor the computing resources and obtain or generate the status information. For example, and without limitation, the monitoring service can obtain logs and metrics from the computing resources and generate alarms based upon the logs or metrics. In some configurations, a predictive analytics service can also be utilized to identify a deviation between current metrics for a computing resource and historical metrics for the computing resource. A summarization can also be generated of the status information.

Once the status information has been obtained, a textual reply to the request for status information can be constructed. The reply includes the status information requested by the user. The textual reply can then be provided to the voice service which, in turn, can translate the textual reply into spoken audio. The spoken audio is then transmitted to the audio capture and playback device for audible playback to the user. Additional details regarding the various components and processes described briefly above will be presented below with regard to FIGS. 1-7.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a software and network architecture diagram showing aspects of the configuration and utilization of a mechanism for voice-driven monitoring of resources in a service provider network 102, according to one particular configuration. As discussed briefly above, the service provider network 102 (which might be referred to herein as the "SPN 102") is a computing network configured to provide computing resources (which might be referred to simply as "resources") on a permanent or an as-needed basis. Among other types of functionalities, the computing resources provided by the service provider network 102 can be utilized to implement various types of network services. The computing resources provided by the service provider network 102 can include data processing resources like VM instances, data storage resources, networking resources, data communication resources, network services, and other types of computing resources.

A customer or potential customer of the service provider network 102, such as the user 106, can utilize an appropriate computing system to communicate with the service provider network 102 over an appropriate data communications network (not shown in FIG. 1). In this way, a customer or other user of the service provider network 102 can configure various aspects of the operation of the computing resources provided by the service provider network 102, or to otherwise control any computing resources being utilized by the customer.

For example, and without limitation, a computing system utilized by a customer of the service provider network 102 can be utilized to purchase computing resources in the service provider network 102, to configure aspects of the operation of the computing resource, to access and utilize functionality provided by the various services and systems described herein, and/or to perform other types of functionality with regard to the operation of the computing resources provided by the service provider network 102.

The computing device utilized to configure and monitor the resources in the service provider network 102 can be any type of computing device capable of connecting to the service provider network 102 via a suitable data communications network such as, but not limited to, a laptop or desktop computer, a tablet computing device, a server computer, a smartphone or, as shown in FIG. 1, an audio capture and playback device 108. Administrative users employed by the owner or operator of the service provider network 102, such as administrators managing the operation of the service provider network 102, can also connect with, manage, and utilize resources provided by network services executing within the service provider network 102 in a similar fashion. Additional details regarding the configuration and operation of the service provider network 102 will be provided below with regard to FIGS. 4-7.

As discussed briefly above, the service provider network 102 can also be configured to execute various types of network services. For example, and without limitation, the service provider network 102 can execute an on-demand computing service 112A, a storage service 112B, a database service 112C, and other network services 112N, some of which are described in greater detail below. Each of the network services 112A-112N can provide different types of computing resources 110 and/or functionality. For instance, the on-demand computing service 112A can provide VM instances 110A, the storage service 112B can provide storage volumes 110B, and the database service 112C can provide databases 110C. Other network services 112N can provide other types of computing resources 110N. In this regard, it should be appreciated that the network services 112A-112N and the respective computing resources 110A-110N that each provides are merely illustrative and that other types of network services can provide other types of computing resources and functionality in other configurations.

As also discussed briefly above and in greater detail below, a monitoring service 124 executes within or in conjunction with the service provider network 102 and collects data regarding the operational state of the services 112A-112N and the resources 110A-110N that each provides in the service provider network 102. For example, the monitoring service 124 might collect data that describes the operational state of hardware resources in the service provider network 102, such as data centers in the service provider network 102, rooms of server computers in each data center, racks of server computers in each room, individual server computers in each rack of server computers, cooling components, power components, and networking components. The monitoring service 124 might similarly collect data that describes the operational state of software resources and instances of computing resources, such as the VM instances 110A, the storage volumes 110B, and/or the database 110C. The monitoring service 124 might also collect data regarding the configuration, status, and operation of other types of network services and computing resources provided by the service provider network 102.

In some implementations, the monitoring service 124 also makes the collected data available for consumption and use by other components. For example, in some configurations, the monitoring service 124 is configured to expose a network services application programming interface ("API") or another mechanism through which other services can request and receive the status information collected for a particular resource. It should be appreciated that while the data is discussed herein primarily in the context of data describing the operational state of a computing resource, the collected data might include other information about a computing resource in the service provider network 102, such as information describing the configuration of the resource or information describing other aspects of a resource. In this way, the monitoring service 124 can be utilized to obtain virtually any type of information about a service or resource in the service provider network 102.

The monitoring service 124 can also obtain and expose operational logs 128 ("logs") for hardware and software components in the service provider network 102. The logs 128 are typically expressed as textual time-series data describing aspects of the operation of a physical or virtual computing system, a software component, a network service, a hardware device, and/or another type of computing resource within the service provider network 102.

The monitoring service 124 can also collect and expose metrics 130. The metrics 130 describe measurements of operational aspects of network services, hardware devices, and/or computing resources within the service provider network 102. For example, the metrics 130 might be collected for VM instances 110A, storage volumes 110B, databases 110C, and/or the services 112A-112C, respectively, that provide them. The metrics 130 can also be associated with third party software products executing within the service provider network 102.

The metrics 130 can measure different characteristics of a computing resource. For example, the metrics 130 might measure processor performance, disk usage, bandwidth used, memory usage, number of writes performed, number of reads performed, number of operations performed, types of operations performed, and the like. Generally, each computing resource can be associated with a list of metrics 130 that can be monitored from within the service provider network 102. For example, a database application can have metrics related to performing database operations, whereas a network application can have metrics related to transferring data across a network. The monitoring service 124 can collect the metrics 130 and expose the metrics 130 to other services via an appropriate network services API or other type of mechanism. It is to be appreciated that the example metrics provided above are merely illustrative and that other types of metrics 130 for other types of components in the service provider network 102 can be collected and exposed in other configurations.

The monitoring service 124 can also be utilized to define and generate alarms 126 based on the metrics 130. For example, and without limitation, an alarm 126 can specify an expected value for one of the metrics 130 for a particular computing resource in the service provider network 102. If the actual value of the metric 130 deviates from the expected value, an alarm 126 can be generated in order to provide the appropriate individual (the user 106, for example) with an indication that the metric 130 deviates from its expected value. The alarm 126 can be provided as a text message, an SMS message, an email message, or in another manner in other configurations. In this regard, it is to be appreciated that the status information provided by the monitoring service 124 can include any type of information describing the operational status of computing resources in the service provider network including, but not limited to, the logs 128, the metrics 130, and the alarms 126. Status information for computing resources in the service provider network 102 can also be obtained from other sources in other configurations.

It is to be appreciated that the monitoring service 124 can also obtain and expose other types of data in other configurations. For example, and without limitation, the monitoring service 124 can obtain change control information that describes changes made to computing resources in the service provider network 102. The change control information can be obtained from a network service that collects and maintains this information. Alternately, the monitoring service 124 can collect and maintain this information itself. Other network services can collect and maintain the change control information in other configurations.

As also shown in FIG. 1, the service provider network 102 is configured to provide a resource metadata tagging service 120 (which might be referred to as the "resource tagging service 120") in one configuration. As discussed briefly above, the resource tagging service 120 enables customers and/or other users of the service provider network 102 to create and associate metadata tags with computing resources in the service provider network 102. The metadata tags can be utilized to collect, filter, and organize the computing resources, to search for and view information about computing resources having matching tags, to manage computing resources with matching tags, and/or to perform other types of functionality.

In one configuration, the resource tagging service 120 is implemented as a network service that executes on computing resources provided by the service provider network 102. The resource tagging service 120 can be configured to provide a network service API (not shown in FIG. 1) for managing metadata tags. For example, and without limitation, the API exposed by the resource tagging service 120 might include methods for creating, updating, retrieving, and deleting metadata tags for resources in the service provider network 102.

Other services executing in the service provider network 102 can call the methods exposed by the API provided by the resource tagging service 120 in order to manage the metadata tags. For example, and without limitation, a management console (not shown in FIG. 1) might be provided in one configuration that provides a GUI 120 for creating, updating, deleting, and otherwise managing the metadata tags and for performing other types of functionality. The management console can call the API provided by the resource tagging service 120 in order to implement the functionality provided through the GUI. As shown in FIG. 1, other services, such as the serverless compute service 116 described below, might also utilize the API exposed by the resource tagging service 120.

In one configuration, the metadata tags are implemented as an alphanumeric tag key and an associated alphanumeric tag value that corresponds to the tag key. For instance, a metadata tag can be associated with several VM instances 110A that includes a tag key of "application." The same tag key can be associated with one or more storage volumes 110B or databases 110C. In this way, the VM instances 110A, storage volumes 110B, and databases 110C can be tagged as being utilized to provide the same application. It should be appreciated that these example metadata tags are merely illustrative and that many more metadata tags might be defined in a similar manner for many more resources in the service provider network 102. It should also be appreciated that a single tag key might have multiple tag values.

The resource tagging service 120 can store the metadata tags in an appropriate data store (also not shown in FIG. 1). The data store can be a database or other type of data store that can store data identifying computing resources in the service provider network 102, along with the metadata tags associated with the resources. The data store might be implemented by the storage service 112B, the database service 112C, or another service executing in the service provider network 102. As will be described in greater detail below, the metadata tags stored by the resource tagging service 120 can be utilized to search for resources 110 having certain metadata tags associated therewith. Logs 128, metrics 130, and/or alarms 126 associated with the resource can then be obtained. Additional details regarding this process will be provided below.

As discussed briefly above, the API provided by the resource tagging service 120 can expose methods for creating metadata tags, to retrieve metadata tags, for searching for computing resources in the service provider network 102 that have certain metadata tags associated therewith, for updating metadata tags, and for deleting metadata tags. Typically, these operations are limited to the resources that are associated with an identity or an account in the service provider network 102 from which the request is made. For example, the user 106 of the service provider network 102 can have an account through which he or she has provisioned certain resources in the service provider network 102. When the resource tagging service 120 performs operations relating to the user's account, such as searching for resources associated with certain metadata tags, these operations will be limited to the resources 110 associated with the user account. Various mechanisms can be utilized to enable the user 106 to authenticate with the service provider network 102.

It is to be appreciated that other types of services can be utilized to store metadata about resources in the service provider network 102. For example, and without limitation, a network service that implements the Resource Description Framework ("RDF") can also be used in some configurations. In other configurations, the resource tagging service 120 implements the RDF data model. Other mechanisms can also be utilized to store and retrieve metadata that is associated with computing resources in the service provider network 102.

As shown in FIG. 1, the service provider network 102 can also include a serverless compute service 116. The serverless compute service 116 is a network service that allows users to execute code (which might be referred to herein as a "function") without provisioning or managing server computers in the service provider network 102. Rather, the serverless compute service 116 can automatically run code, such as the voice command processing function 118 shown in FIG. 1, in response to the occurrence of events. The code that is executed can be stored by the storage service 112B or in another network accessible location. In this regard, it is to be appreciated that the term "serverless compute service" as used herein is not intended to infer that servers are not utilized to execute the program code, but rather that the serverless compute service 116 enables users to execute code without provisioning or managing server computers. The serverless compute service 116 executes program code only when needed, and only utilizes the resources necessary to execute the code. In some configurations, the user or entity executing the code might be charged only for the amount of time required for each execution of their program code.

As will be described in greater detail below, the serverless compute service 116 can execute the voice command processing function 118 in order to identify resources 110 in the service provider network 102 for which status information is to be obtained, obtain the status information, and construct a textual reply to the request that includes the status information. The textual reply can then be provided to the voice service 104, described below, for conversion into spoken audio and playback to the requesting user 106 on the audio capture and playback device 108. Additional details regarding this process are provided below.

As shown in FIG. 1, the service provider network 102 can also include a predictive analytics service 132. The predictive analytics service 132 is a network service that is configured to maintain historical metrics 134 for computing resources 110 in the service provider network 102. The predictive analytics service 132 can obtain the metrics 130 from the monitoring service 124 and store the metrics over time in order to generate the historical metrics 134. The predictive analytics service 132 can also perform various types of statistical analysis on the historical metrics 134. For example, and without limitation, the predictive analytics service 132 might compute averages or means for various historical metrics 134 over various periods of time.

In some configurations, the predictive analytics service 132 can also identify deviations between current metrics 130 for a computing resource 110 and historical metrics 134 for the same resource. As will be described in greater detail below, these deviations can be identified and provided to a user 106 in reply to an utterance 114.

As also shown in FIG. 1, the service provider network 102 can also include a voice service 104. The voice service 104 is a network service that is configured to receive digital audio captured from appropriate audio capture devices, such as the audio capture and playback device 108. The voice service 104 can also translate spoken utterances in the received digital audio into text.

In the example shown in FIG. 1, for instance, the user 106 has uttered the phrase "list active alarms for my streaming service." In this example, the audio capture and playback device 108 records the utterance 114 and transmits digital audio containing the utterance 114 to the voice service 104. The voice service 104 receives the digital audio and converts the utterance 114 into text. The voice service 104 can also provide functionality for identifying the intent of the speaker (i.e. the user) and for extracting important words from spoken phrases. Data specifying the intent and the words extracted from the utterance 114 can then be provided to other services executing in the service provider network 102 such as, but not limited to, the voice command processing function 118 that is executed by the serverless compute service 116.

A custom voice skill configuration 122 can be provided in order to assist the voice service 104 in the identification of the speaker's intent and the words that are to be extracted from the utterance 114. The custom voice skill configuration 122 can define the requests that the voice command processing function 118 can handle and the words that users say to invoke those requests. In one particular configuration, for example, the custom voice skill configuration 122 includes an intent schema that defines the various intents that can be identified within a user utterance 114. The intent schema can be implemented as a JavaScript Object Notation ("JSON") structure that declares the set of commands that a service can accept and process. The JSON structure can include an array that specifies the list of commands that can be sent to the voice command processing function 118.

The custom voice skill configuration 122 can also identify "slots" within an utterance 114 that contain words, numbers, dates, or other types of information that can be extracted from an utterance 114. For example, and without limitation, the JSON structure described above can be utilized to provide mappings between the commands implemented by the voice command processing function 118 and the typical utterances that invoke those commands by adding sets of values for any custom slots supported by the voice command processing function 118 and a list of sample utterances. In this way, the custom voice skill configuration 122 can also define sample utterances that are similar to expected user utterances 114. The sample utterances can provide hints to the voice service 104 about the types of data that is expected to be in each slot. In this regard, it is to be appreciated that the custom voice skill configuration 122 can include other types of information in other configurations.

As will be described in greater detail below, the voice service 104 is also configured to receive text strings such as from the voice command processing function 118, convert the text strings to audio, and to transmit the audio to the audio capture and playback device 108 for audible playback to the user 106. In the example shown in FIG. 1, for instance, the phrase "the active alarms for your streaming service are x, y, and z" has been generated and played back to the user 106 by the audio capture and playback device 108 in response to the user's utterance 114. One mechanism for generating a text string containing the text that is to be played back or displayed to the user 106 responsive to a verbal request for status information regarding computing resources 110 in the service provider network 102 will be described below.

It is to be appreciated that while the configurations disclosed herein are primarily presented in the context of a dedicated audio capture and playback device 108, other types of devices can be utilized to capture utterances 114 and to play back audio 136 containing responses to the utterances 114 in other configurations. For example, and without limitation, smartphones, desktop or laptop computers, tablet computing devices, and other types of computing devices with suitable audio interfaces can be utilized in different configurations.

As discussed briefly above, a user 106 of the service provider network 102 can utilize the audio capture and playback device 108 to issue verbal requests for information about the status of computing resources 110 in the service provider network 102. In one configuration, a user 106 can utilize the management console (not shown in FIG. 1) mentioned above to enable the functionality disclosed herein with regard to computing resources 110 associated with their account with the service provider network 102. Other mechanisms can also be utilized to enable the disclosed functionality for a particular user 106 or group of users.

The audio capture and playback device 108 can record the utterances 114 and transmit them to the voice service 104. Once the voice service 104 has identified the intent of an utterance 114 and extracted words therefrom, the voice service 104 can then provide a request for information to the serverless compute service 116 that identifies the intent of the speaker and includes the words extracted from the verbal utterance 114.

The serverless compute service 116, in turn, executes the voice command processing function 118 for obtaining the requested status information and constructing a textual reply to the request. For example, and without limitation, the voice command processing function 118 can identify the computing resources 110 provided by the service provider network 102 for which status information is to be provided. In some scenarios, the computing resources 110 for which status information is to be provided can be identified directly from the words extracted from the utterance. For instance, if the user 106 specifically identifies the resource that they would like status information for in the utterance 114.

In other scenarios, the resource tagging service 120 can be utilized to identify the computing resources 110 for which the status information is to be provided. For instance, in the example illustrated in FIG. 1, the user 106 has asked for active alarms for their "streaming service." In order to identify the computing resources in the service provider network 102 that are utilized to provide the user's "streaming service," the voice command processing function 118 can make a request to the resource tagging service 120 for data identifying resources associated with the user 106 that have been tagged with the phrase "streaming service." In turn, the resource tagging service 120 can search for resources that have been tagged with "streaming service" and return data identifying those resources to the voice command processing function 118. The computing resources for which status information is to be provided in response to a verbal request can be identified in other ways in other configurations.

Once the computing resources 110 for which status information is to be provided have been identified, the status information can be obtained. In one configuration, for instance, the voice command processing function 118 obtains the requested status information from the monitoring service 124. For instance, in the example shown in FIG. 1, the user 106 has requested active alarms 126 for the resources utilized to implement the "streaming service." In this example, the voice command processing function 118 retrieves data identifying any active alarms 126 for those resources from the monitoring service 124. The voice command processing function 118 can obtain logs 128 and metrics 130 from the monitoring service 124 in response to other types of user requests.

Additionally, the voice command processing function 118 can, in some scenarios, utilize the predictive analytics service 132 to identify a deviation between current metrics 130 for a computing resource and historical metrics 134 for the computing resource. If a deviation is identified, the deviation can be described in the reply to the user request for status information. For instance, if the user 106 asks for the CPU utilization percentage for a particular server, the voice command processing function 118 can obtain metrics 130 that identify the CPU utilization percentage. The voice command processing function 118 can also obtain information identifying a deviation of the current CPU utilization from the historical CPU utilization. This information can also be provided in response to a verbal request from the user 106 for status information.

Once the status information has been obtained from the monitoring service 124, the voice command processing function 118 can construct a textual reply to the request for status information. The reply includes the status information requested by the user 106. For example, and without limitation, the reply might include logs 128, metrics 130, alarms 126, information identifying deviations from historical metrics 134, other types of status information, and/or a summarization of the status information. Other types of information can also be provided.

The voice command processing function 118 can provide the generated textual reply to the voice service 104 which, in turn, can translate the textual reply into audio 136. The audio 136 is then transmitted to the audio capture and playback device 108 for audible playback to the user 106. Additional details regarding this mechanism will be described below with regard to FIGS. 2-3C.

In some configurations, the textual reply can be presented to the user 106 in other ways. For example, and without limitation, the textual reply can be presented to the user 106 in the management console described above. For example, requested logs, metrics, or alarms can be presented visually in the management console. In some configurations, the requested status information is provided visually in addition to the audio playback. In other configurations, only the visual presentation or the audio playback of the requested status information is provided.

Figure 2:
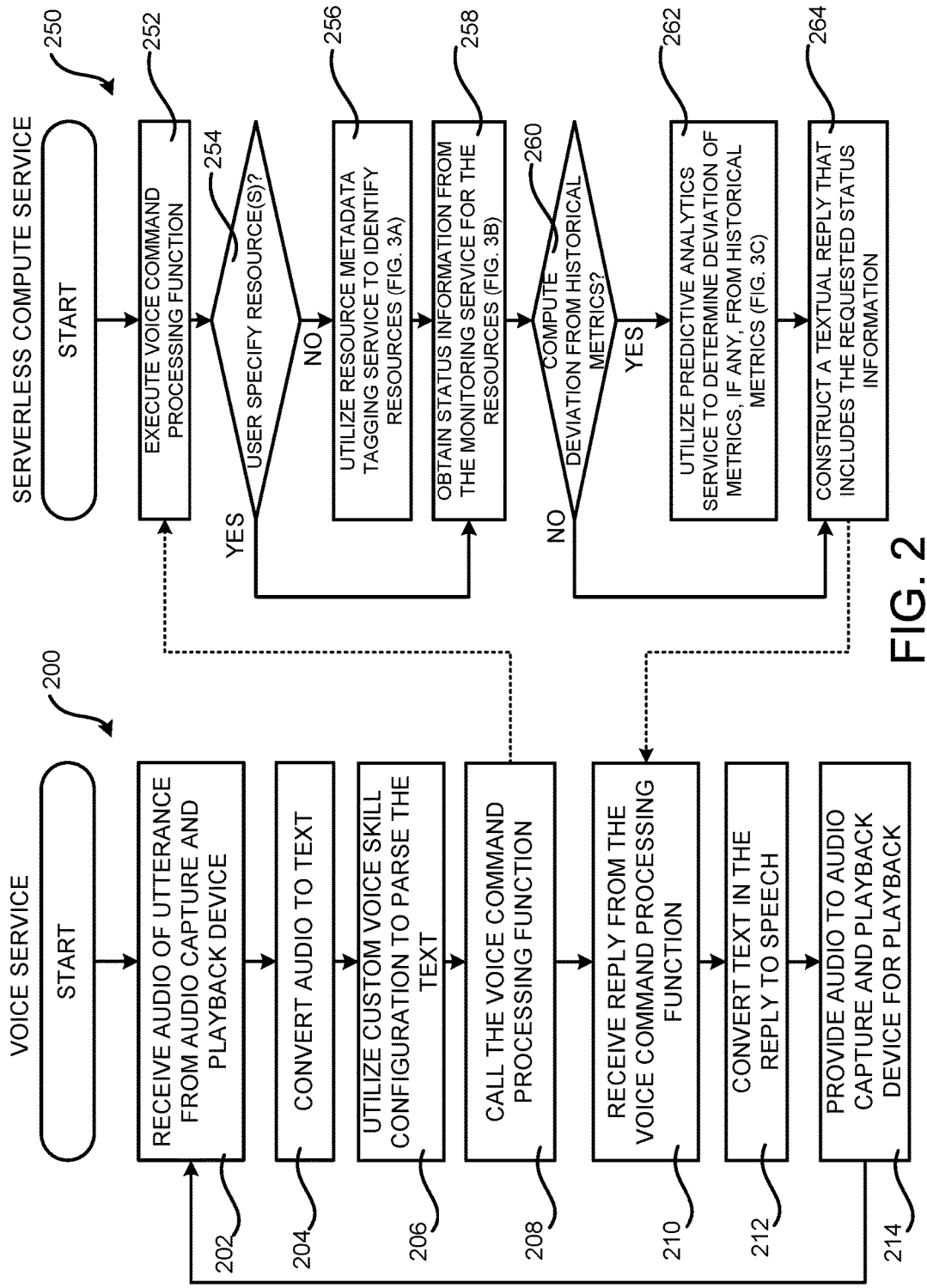
FIG. 2 includes several flow diagrams showing aspects of the operation of the voice service and the serverless compute service shown in FIG. 1, according to one particular configuration.
Figure 3:
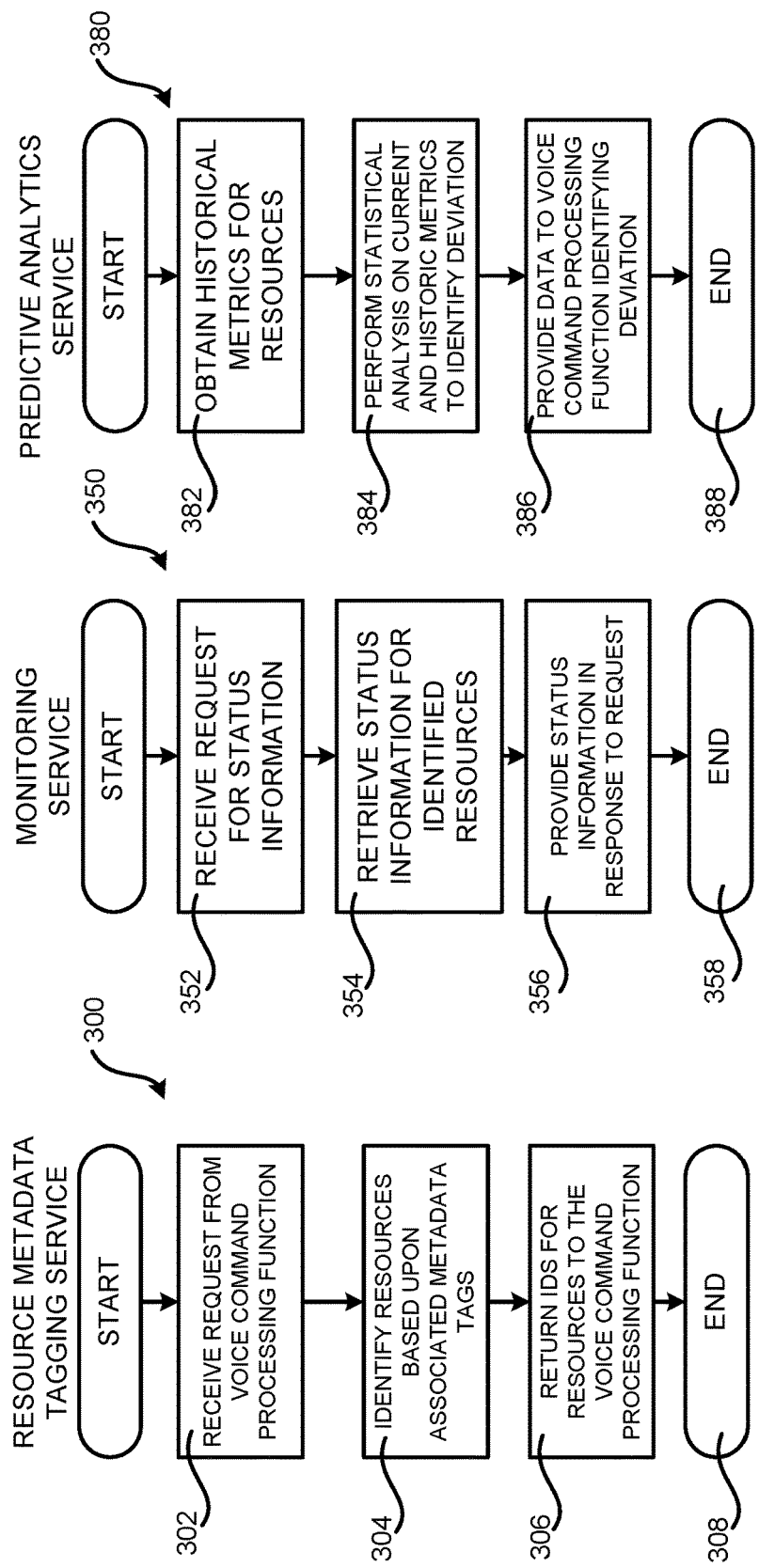
FIGS. 3A-3C are flow diagrams showing routines that illustrate aspects of the operation of the resource metadata tagging service, the monitoring service, and the predictive analytics service shown in FIG. 1, respectively, according to one particular configuration.

FIG. 2 includes several flow diagrams showing routines 200 and 250 that illustrate aspects of the operation of the voice service 104 and the serverless compute service 116 shown in FIG. 1, respectively, according to one particular configuration. The routines 200 and 250 will be described in detail together below.

It should be appreciated that the logical operations described herein with respect to FIG. 2, and the other FIGS., can be implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules.

These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

The routine 200 begins at operation 202, where the voice service 104 receives audio containing an utterance 114 from the audio capture and playback device 108. From operation 202, the routine 200 proceeds to operation 204, where the voice service 104 converts the audible utterance 114 into text. Various mechanisms known to those skilled in the art can be utilized to convert speech to text in this manner. From operation 204, the routine 200 proceeds to operation 206.

At operation 206, the voice service 104 utilizes the custom voice skill configuration 122 to parse the text extracted from the utterance 114 at operation 204. As discussed above, the custom voice skill configuration 122 can include various types of data to assist the voice service 104 with the process of identifying the intent of the utterance 114 and for extracting words of interest to the voice command processing function 118.

According to various configurations, the user 106 can be permitted to request a listing of the available logs 128 or log groups, information indicating how fast the logs 128 are growing, and information indicating how fast the logs 128 are growing. The user 106 can also be permitted to list active alarms 126 for their resources, obtain an ID for the active alarms 126, and obtain other information about the active alarms 126. The user 106 can also be permitted to ask for particular metrics 130 for an individual resource or a group of resources 110. The user 106 can also ask for a list of the metrics 130 that are available for a particular resource. Other utterances 114 can be recognized in other configurations.

Once the text has been parsed in the manner described above, the routine 200 proceeds from operation 206 to operation 208. At operation 208, the voice service 104 calls the serverless compute service 116 and requests execution of the voice command processing function 118. As discussed above, the request transmitted to the serverless compute service 116 and, in turn, the voice command processing function 118, can include data indicating the intent of the utterance 114, words extracted from the utterance 114, and/or other types of information that can be utilized to identify the particular computing resources 110 for which status information is to be provided. The serverless compute service 116 receives the request at operation 252 of the routine 250 and begins execution of the voice command processing function 252.

From operation 252, the routine 250 proceeds to operation 254, where the voice command processing function 118 determines whether the utterance 114 explicitly identifies the computing resources in the service provider network 102 for which status information is to be provided. For example, the utterance 114 might explicitly identify a VM instance 110A or another type of resource by its actual name. In this case, the resource metadata tagging service 120 does not need to be utilized to identify the computing resource 110. Accordingly, if the user 106 has explicitly specified the identity of the resource, or resources, for which status information is to be provided, the routine 250 proceeds from operation 254 to operation 258, which is described below.

If the user 106 has not explicitly specified the resources for which status information is to be provided, the routine 250 proceeds from operation 254 to operation 256. At operation 256, the voice command processing function 118 utilizes the resource metadata tagging service 120 to identify the resources 110 for which status information is to be provided. For example, and without limitation, the voice command processing function 118 can send a metadata tag extracted from the utterance 114 (e.g. "streaming service") to the resource metadata tagging service 120. The resource metadata tagging service 120 can, in turn, utilize the supplied metadata tag to specifically identify the resources 110. The resource metadata tagging service 120 can return data to the voice command processing function 118 that identifies the resources 110. Additional details regarding this process will be provided below with regard to FIG. 3A.

From operation 256, the routine 250 proceeds to operation 258, where the voice command processing function 118 utilizes the information provided by the resource metadata tagging service 120 at operation 256 to obtain the status information for the resources. In one configuration, for example, the voice command processing function 118 transmits the information identifying the resources for which status information is to be provided to the monitoring service 124 to retrieve the requested information. The voice command processing function 118 might request, for example, logs 128, metrics 130, and/or alarms 126 for the resources depending upon the type of status information the user 106 requested in the utterance 114. In turn, the monitoring service 124 returns the requested status information to the voice command processing function 118. Additional details regarding this process will be provided below with regard to FIG. 3B.

From operation 258, the routine 250 proceeds to operation 260 where a determination is made as to whether the statistical deviation from historical metrics 134, if any, is to be calculated for one or more of the resources for which status information is to be provided. If any deviation from historical metrics 134 is not to be computed, the routine 250 proceeds from operation 260 to operation 264, described below. If any deviation is to be identified, the routine 250 proceeds from operation 260 to operation 262, where the voice command processing function 118 utilizes the predictive analytics service 132 to identify a deviation, if any, between the current metrics 130 and the historical metrics 134 for a computing resource 110. Additional details regarding this process will be provided below with regard to FIG. 3C.

From operation 262, the routine 250 proceeds to operation 264, where the voice command processing function 118 constructs a textual reply to the utterance 114 that includes the requested status information. For instance, in the example shown in FIG. 1, the voice command processing function 118 has constructed a text string "the active alarms for your streaming service are x, y, and z." In this example, the values for x, y, and z in this text string represent the actual alarms 126 for computing resources 110 in utilized to implement the user's streaming service. In this regard, it is to be appreciated that different types of text strings can be constructed depending upon the information requested by the user 106. Additionally, it is to be appreciated that a summarization of the information obtained from the monitoring service 124 can also be performed in order to restrict the length of the text string. Once the text string has been constructed, the voice command processing function 118 transmits the text string to the voice service 104.

The voice service 104 receives the text string from the voice command processing function 118 at operation 210 of the routine 200. The routine 200 then proceeds from operation 210 to operation 212, where the voice service 104 converts the text string to speech. Once the voice service 104 has generated the speech, the voice service 104 transmits the audio to the audio capture and playback device 108 for playback to the user 106 responsive to the utterance 114.

As discussed above, the textual reply can also be presented to the user 106 in other ways. For example, and without limitation, the textual reply can be presented to the user 106 in the management console described above. For example, requested logs, metrics, or alarms can be presented visually in the management console or in another type of user interface. In some configurations, the requested status information is provided visually in addition to the audio playback. In other configurations, only the visual presentation or the audio playback of the requested status information is provided. The routine 200 then proceeds back from operation 214 to operation 202, where an additional utterance 114 can be processed in the same manner.

FIGS. 3A-3C are flow diagrams showing routines 300, 350, and 380 that illustrate aspects of the operation of the resource metadata tagging service 120, the monitoring service 124, and the predictive analytics service 132 shown in FIG. 1, respectively, according to one particular configuration. The routines 300, 350, and 380 will be described separately in detail below.

The routine 300 begins at operation 302, where the resource tagging service 120 receives a request from the voice command processing function 118 for data identifying one or more resources in the service provider network 102. As discussed above, such a request can include one or more metadata tags identified from the utterance 114. From operation 302, the routine 300 proceeds to operation 304.

At operation 304, the resource tagging service 120 identifies any resources in the service provider network 102 that are associated with the user 106 and that also have the supplied metadata tags associated therewith. As discussed above, the resource tagging service 120 can maintain or access a data store that includes data mapping metadata tags to resources in the service provider network 102. From operation 304, the routine 300 proceeds to operation 306.

At operation 306, the resource tagging service 120 returns identifiers ("IDs") for the resources identified at operation 304 to the voice command processing function 118. As discussed above, the voice command processing function 118 can, in turn, utilize the IDs to obtain status information for the resources from the monitoring service 124. From operation 306, the routine 300 proceeds to operation 308, where it ends.

The routine 350 begins at operation 352, where the monitoring service 124 receives a request for status information from the voice command processing function 118. As discussed above, such a request can include information identifying the resources for which status information is requested and the type of information that is requested. For instance, logs 128, metrics 130, and/or alarms 126 can be requested for each resource. Other types of status information can be requested in other configurations. The monitoring service 124 retrieves the requested status information at operation 354.

From operation 354, the routine 350 proceeds to operation 356, where the monitoring service 124 transmits the requested status information to the voice command processing function 118 in response to the request received at operation 352. The routine 350 then proceeds from operation 356 to operation 358, where it ends.

The routine 380 begins at operation 382, where the predictive analytics service 132 obtains the historical metrics 134 for the resource for which a deviation from the historical metrics 134 is to be computed. The predictive analytics service 132 can also obtain the current metrics 130 for the resource. The routine 380 then proceeds from operation 382 to operation 384.

At operation 384, the predictive analytics service 132 performs one or more statistical analyses on the current metrics 130 and the historical metrics 134 for the resource to identify any deviation. For example, and without limitation, the predictive analytics service 132 can identify statistically meaningful deviations in the average or mean values between the current metrics 130 and the historical metrics 134 for a resource. Once the deviations, if any, have been identified, the routine 380 can proceed from operation 384 to operation 386, where the predictive analytics service 132 can provide data identifying the deviations to the voice command processing function 118. The routine 380 then proceeds from operation 386 to operation 388, where it ends.

Figure 4:
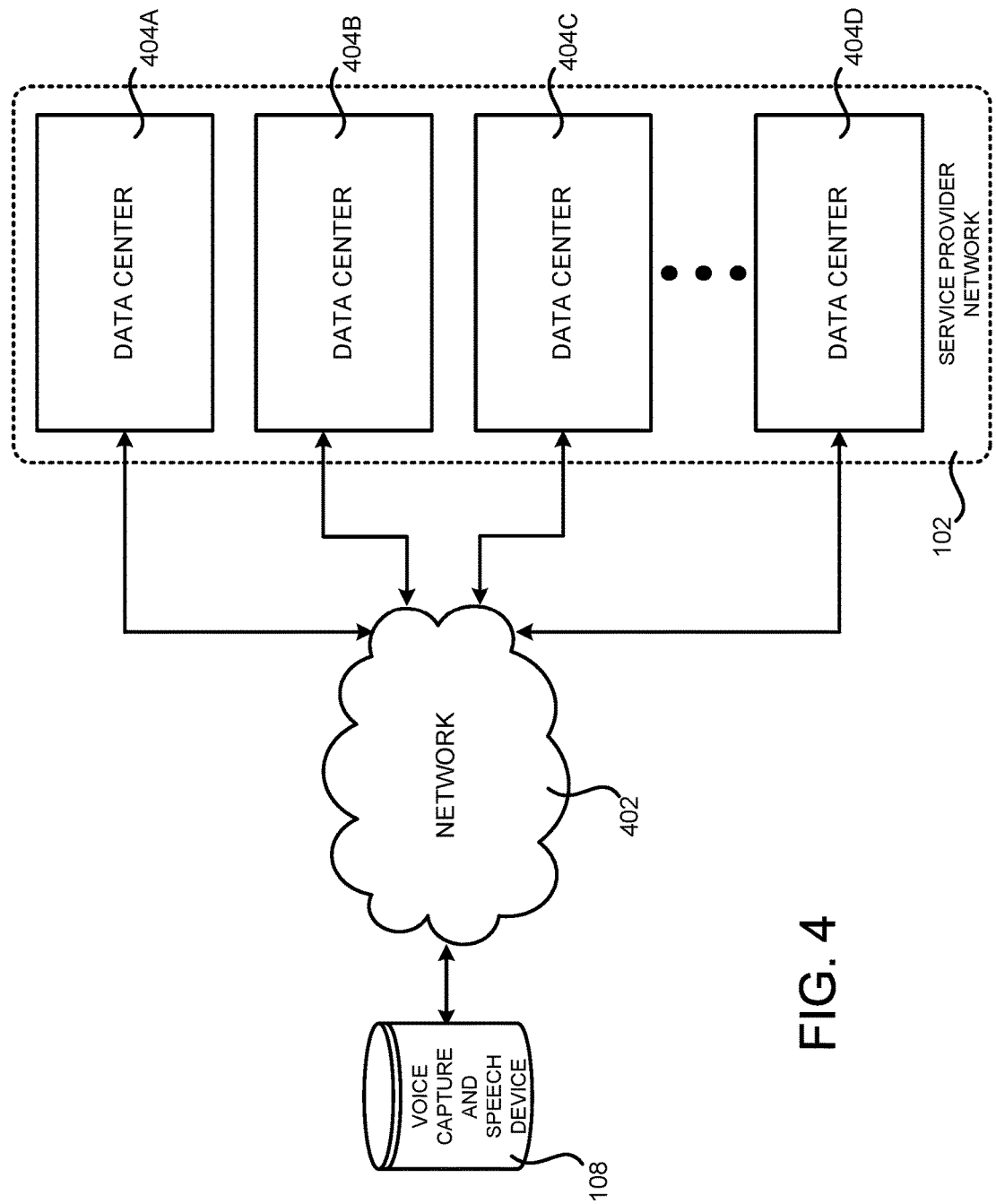
FIG. 4 is a system and network diagram that shows an illustrative operating environment that includes a service provider network that can be configured to implement aspects of the functionality described herein.

FIG. 4 is a system and network diagram that shows one illustrative operating environment for the configurations disclosed herein that includes a service provider network 102 that can be configured to execute the voice service 104, the serverless compute service 116, the voice command processing function 118, and the other network services described above, according to one configuration disclosed herein. As discussed above, the service provider network 102 can execute network services that provide computing resources on a permanent or an as-needed basis. Among other types of functionality, the computing resources provided by the service provider network 102 can be utilized to implement the various network services described herein. As also discussed above, the computing resources provided by the service provider network 102 can be data processing resources, such as VM instances, data storage resources, networking resources, data communication resources, network services, and other types of resources.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 102 can also be configured to provide other types of computing resources not mentioned specifically herein.

As also discussed above, the computing resources provided by the service provider network 102 are enabled in one implementation by one or more data centers 404A-404D (which might be referred to herein singularly as "a data center 404" or collectively as "the data centers 404"). The data centers 404 are facilities utilized to house and operate computer systems and associated components. The data centers 404 typically include redundant and backup power, communications, cooling, and security systems. The data centers 404 can also be located in geographically disparate locations. One illustrative configuration for a data center 404 that can be utilized to implement the technologies disclosed herein will be described below with regard to FIG. 5.

The customers and other users of the service provider network 102 can access the computing resources provided by the service provider network 102 over a network 402, which can be a wide area communication network ("WAN"), such as the Internet, an intranet or an Internet service provider ("ISP") network or a combination of such networks. For example, and without limitation, a computing device operated by a customer or other user of the service provider network 102, such as the audio capture and playback device 108 or another type of computing device, can be utilized to access the service provider network 102 by way of the network 402. It should be appreciated that a local-area network ("LAN"), the Internet, or any other networking topology known in the art that connects the data centers 404 to remote customers and other users can be utilized. It should also be appreciated that combinations of such networks can also be utilized.

Figure 5:
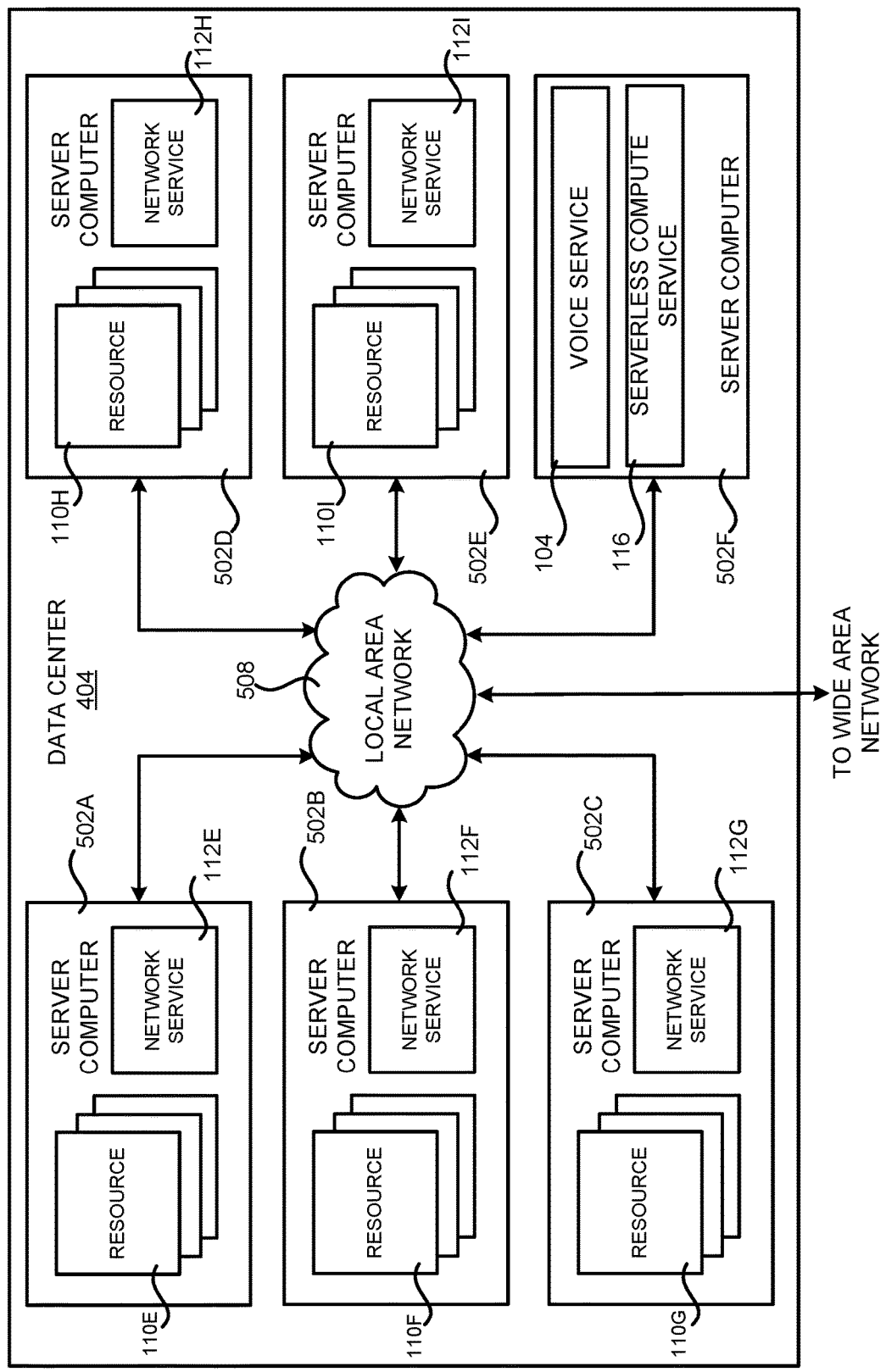
FIG. 5 is a computing system diagram illustrating a configuration for a data center that can be utilized to implement aspects of the technologies disclosed herein.

FIG. 5 is a computing system diagram that illustrates one configuration for a data center 404 that can be utilized to implement the voice service 104, the serverless compute service 116, and the other network services disclosed herein. The example data center 404 shown in FIG. 5 includes several server computers 502A-502E (which might be referred to herein singularly as "a server computer 502" or in the plural as "the server computers 502") for providing the computing resources 110A-110I.

The server computers 502 can be standard tower, rack-mount, or blade server computers configured appropriately for providing the various computing resources described herein (illustrated in FIG. 5 as the computing resources 110E-110I). As mentioned above, the computing resources 110 provided by the service provider network 102 can be data processing resources such as VM instances or hardware computing systems, data storage resources, database resources, networking resources, and others. Some of the servers 502 can also be configured to execute network services capable of instantiating, providing and/or managing the computing resources 110, some of which are described in detail herein.

The data center 404 shown in FIG. 5 also includes a server computer 502F that can execute some or all of the software components described above. For example, and without limitation, the server computer 502F can be configured to execute the voice service 104 or the serverless compute service 116, both of which were described in detail above. The server computer 502F can also be configured to execute other components and/or to store data for providing some or all of the functionality described herein. In this regard, it should be appreciated that components or different instances of the voice service 104 and the serverless compute service 116. can execute on many other physical or virtual servers in the data centers 404 in various configurations.

In the example data center 404 shown in FIG. 5, an appropriate LAN 508 is also utilized to interconnect the server computers 502A-502F. The LAN 508 is also connected to the network 402 illustrated in FIG. 4. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 404A-404D, between each of the server computers 502A-502F in each data center 404, and, potentially, between computing resources 110 in each of the data centers 404. It should be appreciated that the configuration of the data center 404 described with reference to FIG. 5 is merely illustrative and that other implementations can be utilized.

Figure 6:
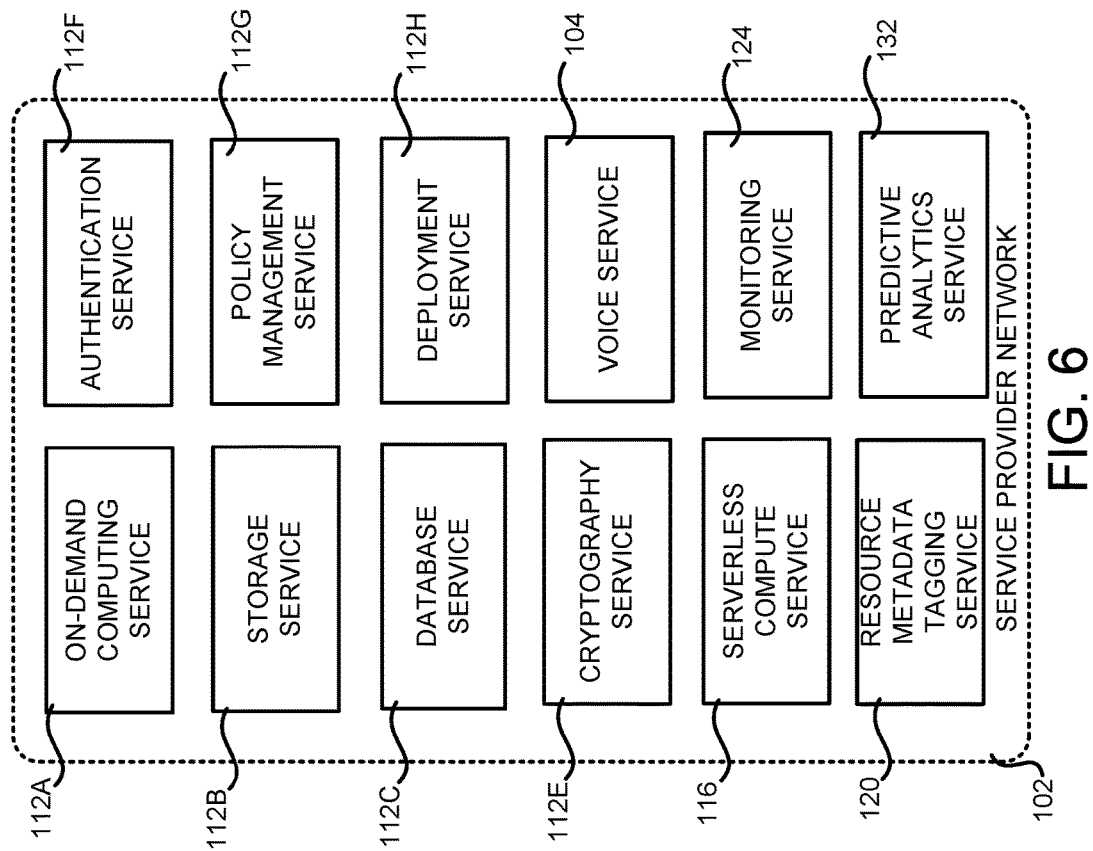
FIG. 6 is a network services diagram that shows aspects of several services that can be provided by and utilized within a service provider network configured to implement the various technologies disclosed herein.

FIG. 6 is a system and network diagram that shows aspects of several network services that can be provided by and utilized within a service provider network 102 in one configuration disclosed herein. In particular, and as discussed above, the service provider network 102 can provide a variety of network services to customers and other users of the service provider network 102 including, but not limited to, the on-demand computing service 112A, the storage service 112B, the database service 112C, a cryptography service 112E, an authentication service 112F, a policy management service 112G, and a deployment service 112H. The service provider network 102 can also provide the voice service 104, the serverless compute service 116, the resource metadata tagging service 120, the monitoring service 124, and the predictive analytics service 132. The service provider network 102 can also provide other types of network services, some of which are described below.

It is to be appreciated that customers of the service provider network 102 can include organizations or individuals that utilize some or all of the network services provided by the service provider network 102. As described above, a customer or other user can communicate with the service provider network 102 using an appropriate computing device through a network, such as the network 402 shown in FIG. 4.

It is also noted that not all configurations described include the network services shown in FIG. 6 and that additional network services can be provided in addition to or as an alternative to the services explicitly described herein. Each of the services shown in FIG. 6 can also expose web service interfaces that enable a caller to submit appropriately configured application programming interface ("API") calls to the various services through web service requests. The various web services can also expose GUIs, command line interfaces ("CLIs"), and/or other types of interfaces for accessing the functionality that they provide. In addition, each of the services can include service interfaces that enable the services to access each other (e.g., to enable a VM provided by the on-demand computing service 112A to store data in or retrieve data from the storage service 112B). Additional details regarding some of the services shown in FIG. 6 will now be provided.

As discussed above, the on-demand computing service 112A can be a collection of computing resources configured to instantiate VM instances and to provide other types of computing resources 110 on demand. For example, a customer or other user of the service provider network 102 can interact with the on-demand computing service 112A (via appropriately configured and authenticated API calls, for example) to provision and operate VM instances that are instantiated on physical computing devices hosted and operated by the service provider network 102. The VM instances can be used for various purposes, such as to operate as servers supporting the network services described herein, a web site, to operate business applications or, generally, to serve as computing resources for the customer.

Other applications for the VM instances can be to support database applications, electronic commerce applications, business applications and/or other applications. Although the on-demand computing service 112A is shown in FIG. 6, any other computer system or computer system service can be utilized in the service provider network 102 to implement the functionality disclosed herein, such as a computer system or computer system service that does not employ virtualization and instead provisions computing resources on dedicated or shared computers/servers and/or other physical devices.

The storage service 112B can include software and computing resources that collectively operate to store data using block or file-level storage devices (and/or virtualizations thereof). The storage devices of the storage service 112B can, for example, be operationally attached to virtual computer systems provided by the on-demand computing service 112A to serve as logical units (e.g., virtual drives) for the computer systems. A storage device can also enable the persistent storage of data used/generated by a corresponding virtual computer system where the virtual computer system service can only provide ephemeral data storage.

The service provider network 102 can also include a cryptography service 112E. The cryptography service 112E can utilize storage services of the service provider network 102, such as the storage service 112B, to store encryption keys in encrypted form, whereby the keys can be usable to decrypt customer keys accessible only to particular devices of the cryptography service 112E. The cryptography service 112E can also provide other types of functionality not specifically mentioned herein.

As illustrated in FIG. 6 and discussed above, the service provider network 102, in various configurations, also includes an authentication service 112F and a policy management service 112G. The authentication service 112F, in one example, is a computer system (i.e., collection of computing resources 110) configured to perform operations involved in authentication of users. For instance, one of the services shown in FIG. 6 can provide information from a user to the authentication service 112F to receive information in return that indicates whether or not the requests submitted by the user are authentic.

The policy management service 112G, in one example, is a network service configured to manage policies on behalf of customers or internal users of the service provider network 102. The policy management service 112G can include an interface that enables customers to submit requests related to the management of policy, such as a security policy. Such requests can, for instance, be requests to add, delete, change or otherwise modify policy for a customer, service, or system, or for other administrative actions, such as providing an inventory of existing policies and the like.

The service provider network 102 can additionally maintain other network services based, at least in part, on the needs of its customers. For instance, the service provider network 102 can maintain a deployment service 112H for deploying program code and/or the database service 112C in some configurations. The deployment service 112H provides functionality for deploying program code, such as to virtual or physical hosts provided by the on-demand computing service 112A.

As also discussed briefly above, the database service 112C can be a collection of computing resources that collectively operate to create, maintain, and allow queries to be performed on databases stored within the service provider network 102. For example, a customer or other user 106 of the service provider network 102 can operate and manage a database provided by the database service 112C by utilizing appropriately configured network API calls. This, in turn, can allow the customer to maintain and potentially scale the operations in the database.

Other services include the voice service 104, the serverless compute service 116, the resource metadata tagging service 120, the monitoring service 124, and the predictive analytics service 132, which have been described in detail above. The service provider network 102 can also include object-level archival data storage services, and services that manage, monitor, interact with, or support other services. The service provider network 102 can also be configured with other network services not specifically mentioned herein in other configurations.

Figure 7:
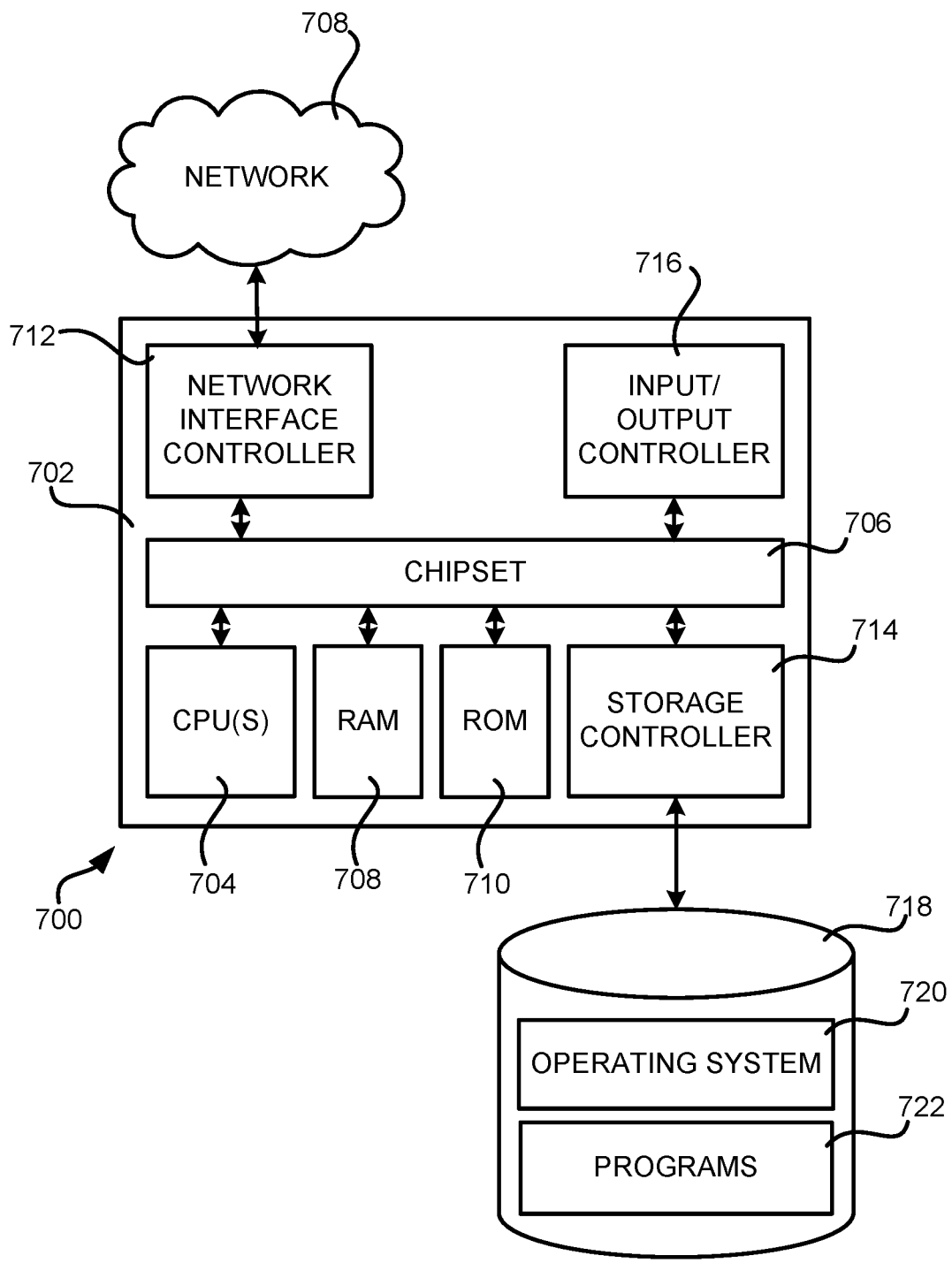
FIG. 7 is a computer architecture diagram showing an illustrative computer hardware architecture for implementing a computing device that can be utilized to implement aspects of the various technologies presented herein.

FIG. 7 shows an example computer architecture for a computer 700 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network 708. The chipset 706 can include functionality for providing network connectivity through a MC 712, such as a gigabit Ethernet adapter. The NIC 712 is capable of connecting the computer 700 to other computing devices over the network 708. It should be appreciated that multiple NICs 712 can be present in the computer 700, connecting the computer to other types of networks and remote computer systems.

The computer 700 can be connected to a mass storage device 718 that provides non-volatile storage for the computer. The mass storage device 718 can store an operating system 720, programs 722, and data, which have been described in greater detail herein. The mass storage device 718 can be connected to the computer 700 through a storage controller 714 connected to the chipset 706. The mass storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the mass storage device 718 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 718 is characterized as primary or secondary storage, and the like.

For example, the computer 700 can store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the mass storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 718 can store an operating system 720 utilized to control the operation of the computer 700. According to one configuration, the operating system comprises the LINUX operating system or one of its variants such as, but not limited to, UBUNTU, DEBIAN, and CENTOS. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 718 can store other system or application programs and data utilized by the computer 700.

In one configuration, the mass storage device 718 or other computer-readable storage media is encoded with computer-executable instructions which, when loaded into the computer 700, transform the computer from a general-purpose computing system into a special-purpose computer capable of implementing the configurations described herein. These computer-executable instructions transform the computer 700 by specifying how the CPUs 704 transition between states, as described above. According to one configuration, the computer 700 has access to computer-readable storage media storing computer-executable instructions which, when executed by the computer 700, perform the various processes described above with regard to FIGS. 1-3C. The computer 700 can also include computer-readable storage media for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, a plotter, or other type of output device. It will be appreciated that the computer 700 might not include all of the components shown in FIG. 7, can include other components that are not explicitly shown in FIG. 7, or can utilize an architecture completely different than that shown in FIG. 7.

Based on the foregoing, it should be appreciated that technologies for voice-driven monitoring of resources in a service provider network have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A service provider network providing computing resources to electronic devices of one or more users, the service provider network comprising:
   one or more servers; and
   a non-transitory computer-readable storage medium having instructions stored thereupon which, when executed by the one or more servers, cause the one or more servers to:
      receive, by a voice service executing in the service provider network and from a user from the one or more users, a request, the request comprising a verbal utterance by the user and requesting status information for computing resources provided by the service provider network to one or more electronic devices of the user;
      convert, by the voice service, the request into text comprising one or more words extracted from the verbal utterance;
      forward the text from the voice service to a serverless compute service executing in the service provider network, the serverless compute service providing a network service that allows the one or more users to execute code without provisioning or managing any of the one or more servers of the service provider network;
      execute program code by way of the serverless compute service, the program code configured to
         identify the computing resources provided by the service provider network for which the status information is to be provided directly from the words extracted from the verbal utterance or utilizing a metadata tagging service executing in the service provider network,
         obtain the status information for the computing resources from a monitoring service executing in the service provider network,
         construct a textual reply to the request, the textual reply comprising at least the status information, and
         provide the textual reply to the voice service for conversion to audio;
      convert, by the voice service, the textual reply into audio; and
      forward, by the voice service, the audio to a playback device for outputting the audio to the user.

2. The service provider network of claim 1, wherein identify the computing resources provided by the service provider network for which the status information is to be provided comprises:
   providing at least one of the words extracted from the verbal utterance to the resource metadata tagging service; and
   receiving data identifying the computing resources provided by the service provider network for which the status information is to be provided from the resource metadata tagging service.

3. The service provider network of claim 1, wherein the computing resources provided by the service provider network for which the status information is to be provided are identified based upon at least one of the words extracted from the verbal utterance.

4. The service provider network of claim 1, wherein the status information comprises one or more metrics for the computing resources,
   wherein the program code executing by way of the serverless compute service is further configured to utilize an analytics service executing in the service provider network to identify a deviation between metrics for the computing resources provided by the service provider network, and
   wherein the textual reply further comprises data identifying the deviation.

5. The service provider network of claim 1, wherein the program code executing by way of the serverless compute service is further configured to generate a summarization of the status information, and wherein the textual reply further comprises the summarization.

6. The service provider network of claim 1, wherein the status information comprises one or more of alarms, logs, metrics, or change control information for the computing resources provided by the service provider network.

7. A computer-implemented method for voice-driven monitoring of computing resources in a service provider network providing computing resources to electronic devices of one or more users, the method comprising:
   receiving, by a voice service executing in the service provider network and from a user from the one or more users, a request for status information for the computing resources in the service provider network, the request comprising a verbal utterance from the user requesting the status information for the computing resources provided by the service provider network to one or more electronic devices of the user;
   converting, by the voice service, the request into text comprising one or more words extracted from the verbal utterance;
   forwarding, by the voice service to a serverless compute service executing in the service provider network, the text, the serverless compute service providing a network service that allows the one or more users to execute code without provisioning or managing any of the one or more servers of the service provider network;

identifying, by the serverless compute service and based at least in part on the one or more words, the computing resources provided by the service provider network for which the status information is to be provided;

obtaining, by the serverless compute service, the status information for the computing resources from a monitoring service executing in the service provider network;

constructing, by the serverless compute service, a textual reply to the request, the reply comprising at least the status information;

forwarding, by the serverless compute service to the voice service, the textual reply in response to the request;

converting, by the voice service, the textual reply into audio; and forwarding, by the voice service, the audio to a playback device.

8. The computer-implemented method of claim 7, wherein identifying the computing resources provided by the service provider network for which the status information is to be provided comprises:

providing at least one of the words extracted from the verbal utterance to a resource metadata tagging service executing in the service provider network; and receiving data identifying the computing resources provided by the service provider network for which the status information is to be provided from the resource metadata tagging service.

9. The computer-implemented method of claim 7, wherein the computing resources provided by the service provider network for which the status information is to be provided are identified based upon at least one of the words extracted from the verbal utterance.

10. The computer-implemented method of claim 7, wherein the status information comprises one or more metrics for the computing resources, wherein the method further comprises utilizing an analytics service executing in the service provider network to identify a deviation between metrics and one more historical metrics for the computing resources provided by the service provider network, and wherein the textual reply further comprises data identifying the deviation.

11. The computer-implemented method of claim 7, further comprising generating a summarization of the status information, and wherein the textual reply further comprises the summarization.

12. The computer-implemented method of claim 7, wherein the status information comprises one or more of alarms, logs, metrics, or change control information for the computing resources provided by the service provider network.

13. The computer-implemented method of claim 7, wherein the identifying, obtaining, and constructing operations are performed by program code executed by the serverless compute service.

14. A non-transitory computer-readable storage medium having instructions stored thereupon which are executable by a processor and which, when executed, cause the processor to:

receive, from a user by a voice service executing in a service provider network providing computing resources to one or more electronic devices of the user, a request for status information for computing resources in the service provider network, the request comprising a verbal utterance from the user requesting the status information for the computing resources provided by the service provider network to the one or more electronic devices of the user;

convert, by the voice service, the request into text comprising one or more words extracted from the verbal utterance;

forward, by the voice service to a serverless compute service executing in the service provider network, the text, the serverless compute service providing a network service that allows one or more users to execute code without provisioning or managing any of the one or more servers of the service provider network;

identify, by the serverless compute service and based at least in part on the one or more words, the computing resources provided by the service provider network for which the status information is to be provided;

obtain, by the serverless compute service, the status information for the computing resources from a monitoring service executing in the service provider network;

construct, by the serverless compute service, a textual reply to the request, the reply comprising at least the status information;

forward, by the serverless compute service to the voice service, the textual reply in response to the request;

convert, by the voice service, the textual reply into audio; and forward, by the voice service, the audio to a playback device.

15. The non-transitory computer-readable storage medium of claim 14, wherein identify the computing resources provided by the service provider network for which the status information is to be provided comprises:

providing at least one of the words extracted from the verbal utterance to a resource metadata tagging service executing in the service provider network; and receiving data identifying the computing resources provided by the service provider network for which the status information is to be provided from the resource metadata tagging service.

16. The non-transitory computer-readable storage medium of claim 14, wherein the computing resources provided by the service provider network for which the status information is to be provided are identified based upon at least one of the words extracted from the verbal utterance.

17. The non-transitory computer-readable storage medium of claim 14, wherein the status information comprises one or more metrics for the computing resources, wherein the non-transitory computer-readable storage medium has further instructions stored thereupon to utilize an analytics service executing in the service provider network to identify a deviation between metrics for the computing resources provided by the service provider network, and wherein the reply further comprises data identifying the deviation.

18. The non-transitory computer-readable storage medium of claim 14, having further instructions stored thereupon to generate a summarization of the status information, and wherein the textual reply further comprises the summarization.

19. The non-transitory computer-readable storage medium of claim 14, wherein the status information comprises one or more of alarms, logs, metrics, or change control information for the computing resources provided by the service provider network, and wherein the status information is converted to spoken text or displayed.

20. The non-transitory computer-readable storage medium of claim 14, wherein program code executed by a serverless compute service in the service provider network identifies the computing resources provided by the service provider network for which the status information is to be provided, obtains the status information for the computing resources, constructs the textual reply to the request, and provides the textual reply in response to the request.

\* \* \* \* \*